United States Patent [19]

Allen et al.

[11] Patent Number: 4,634,512

[45] Date of Patent: Jan. 6, 1987

[54] DISK AND PLUG

[75] Inventors: Ronald Allen, San Jose; Tu Chen, Saratoga, both of Calif.

[73] Assignee: Komag, Inc., Milpitas, Calif.

[21] Appl. No.: 798,554

[22] Filed: Nov. 15, 1985

Related U.S. Application Data

[63] Continuation-in-part of Ser. No. 642,853, Aug. 21, 1984.

[51] Int. Cl.$^4$ .............................................. C23C 15/00
[52] U.S. Cl. ..................... 204/298; 118/500; 118/501; 118/502; 118/503; 118/504; 118/505; 204/192.1; 204/192.2; 220/230; 292/251.5; 292/347; 292/358
[58] Field of Search ............. 204/298, 192 R, 192 M; 118/500, 501, 502, 503, 504, 505; 292/251.5, 347, 358; 220/230

[56] References Cited

U.S. PATENT DOCUMENTS

| | | | |
|---|---|---|---|
| 2,911,347 | 11/1959 | Gutzmer | 204/29 R M |
| 3,141,989 | 7/1964 | Jones et al. | 204/298 |
| 4,223,799 | 9/1980 | Eyster et al. | 220/230 |
| 4,282,924 | 8/1981 | Faretra | 204/298 |
| 4,473,455 | 9/1984 | Dean et al. | 204/298 |
| 4,485,000 | 11/1984 | Kawaguchi | 204/298 |
| 4,500,407 | 2/1985 | Boys et al. | 204/192 R |
| 4,505,007 | 3/1985 | Aoki | 292/251.5 |
| 4,558,388 | 12/1985 | Graves et al. | 204/192 R |

OTHER PUBLICATIONS

Lennon IBM Tech. Disc. Bull. 22 (1980) pp. 5354-5.

*Primary Examiner*—Arthur P. Demers
*Attorney, Agent, or Firm*—Thomas S. MacDonald; Alan H. MacPherson; Steven F. Caserza

[57] ABSTRACT

A carrier is provided to hold a central apertured disk while magnetic material is plated simultaneously on the annular surfaces on both sides of the disk. The carrier contains a first opening substantially the same diameter as the disk and a second opening formed about a center line offset from the center line of the first opening so as to form a recess around a portion of the edge of the first opening. The disk is inserted into the first opening and recess to block the flow of plasma and impurities from one side of the disk to the other during the disk surface coating. A two-part plug is provided for placement in and sealing the center aperture of the disk. One plug part contains a spring or magnetic means for holding the two parts together within the disk. The plug includes a knob for handling, carrying and mounting or removing the disk from the carrier. A plurality of openings is provided in the carrier to allow both surfaces of a corresponding plurality of disks to be coated simultaneously with magnetic media with plugs sealing the central aperture of each disk during processing.

16 Claims, 19 Drawing Figures

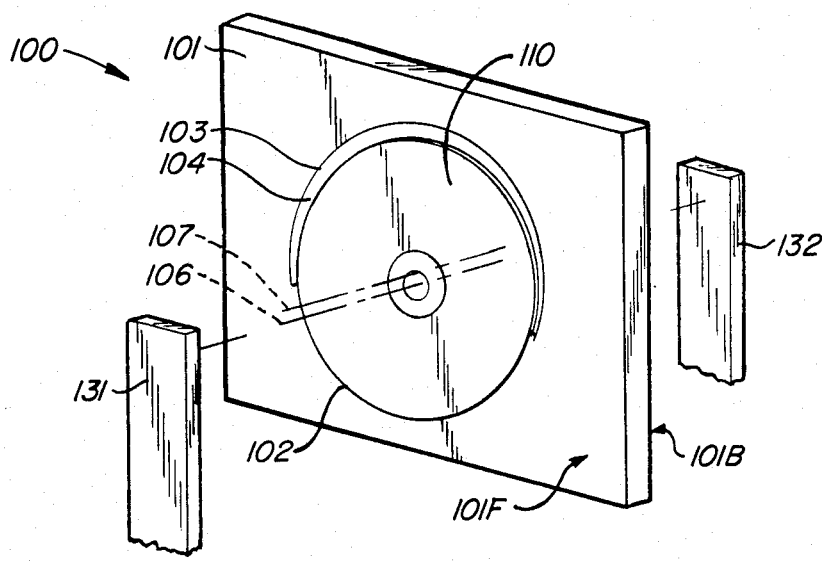
FIG._1.
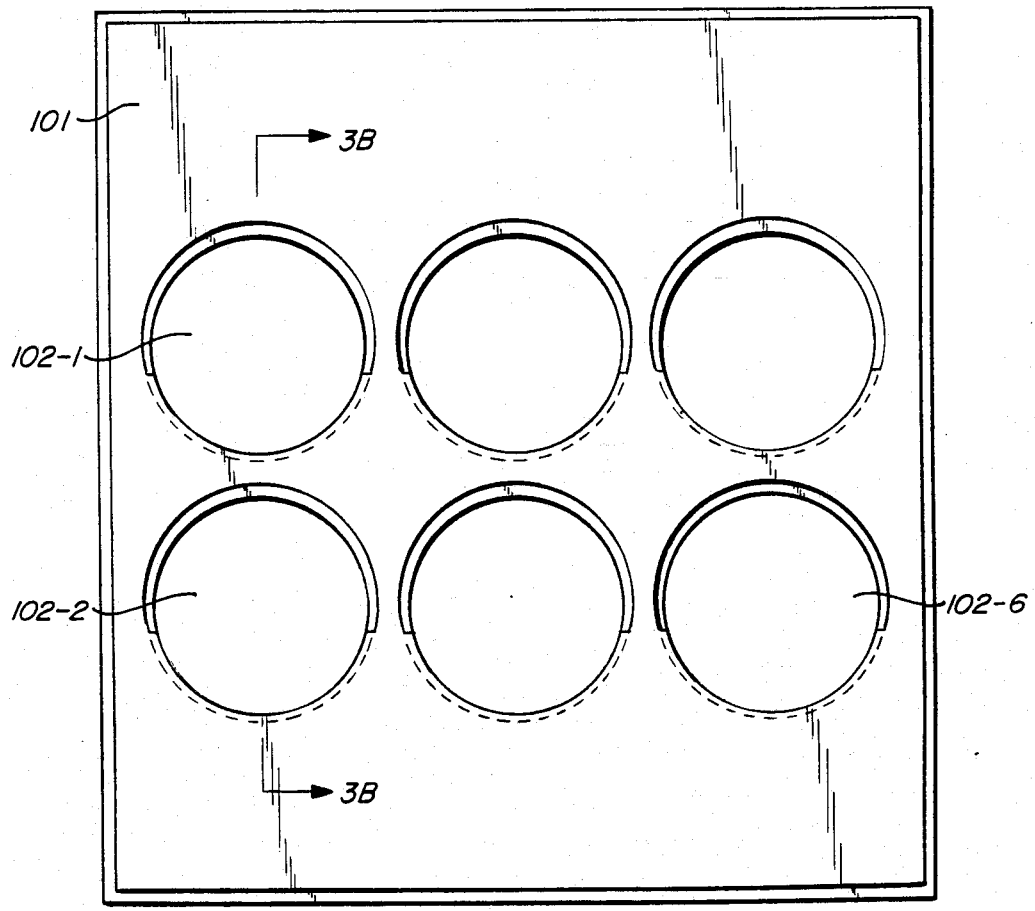
FIG._4.

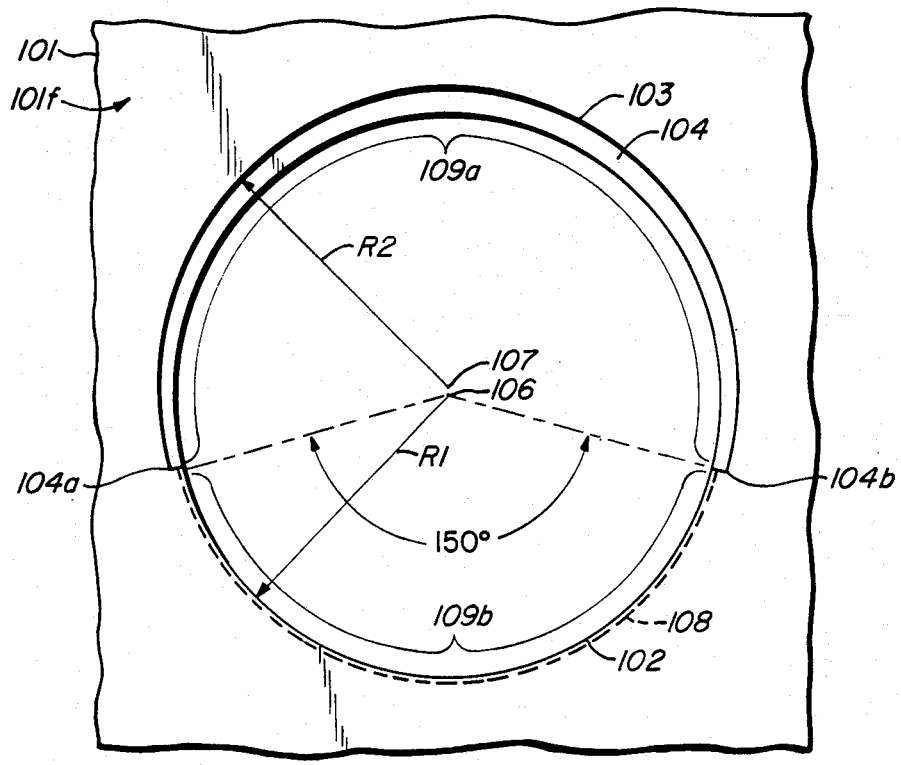
FIG._2a.
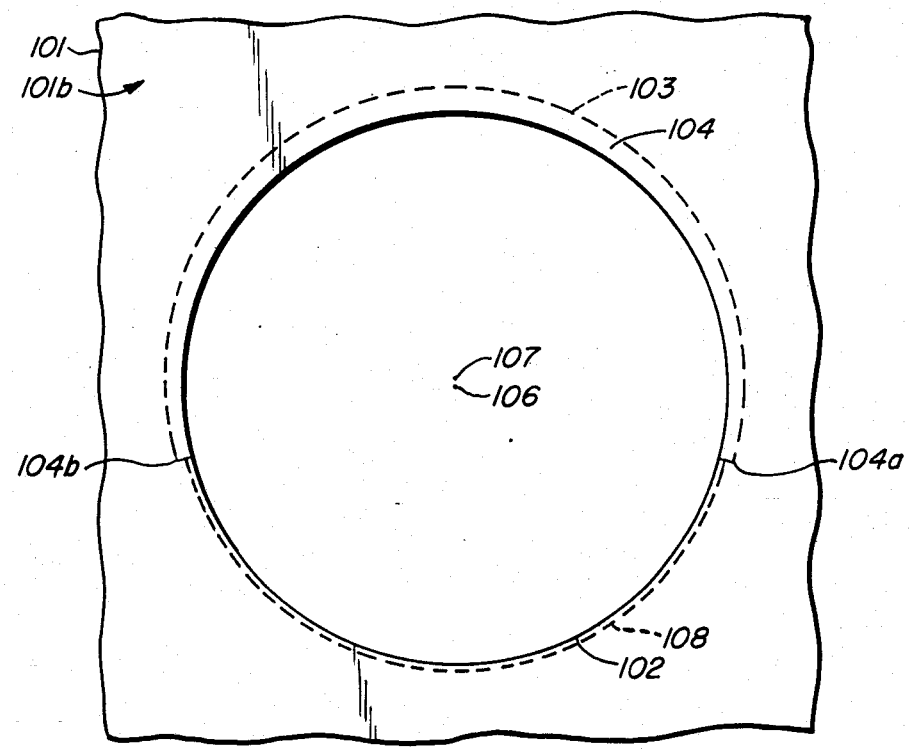
FIG._2b.

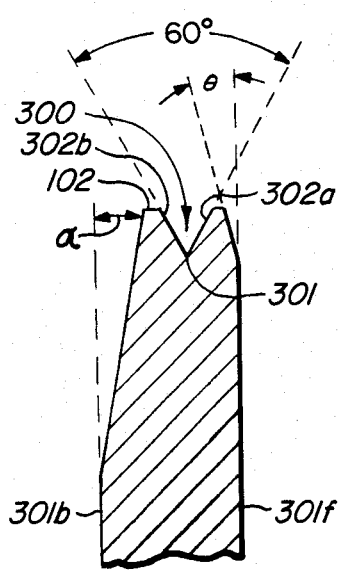
FIG._3a.
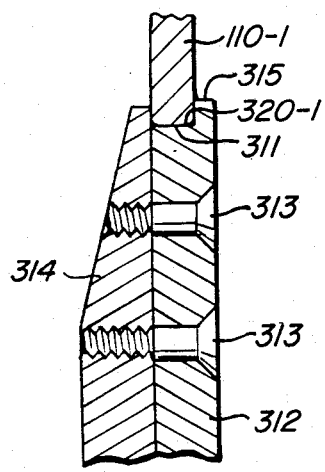
FIG._3c.
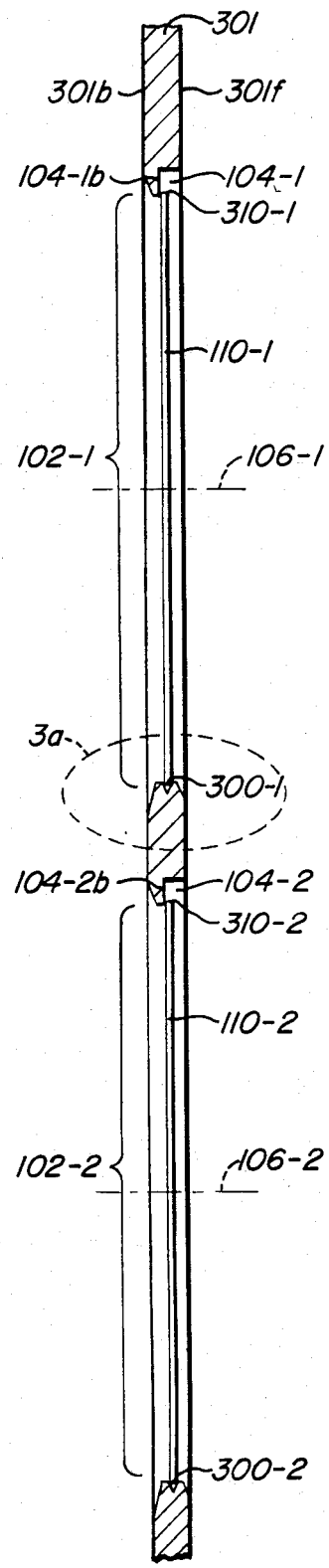
FIG._3b.

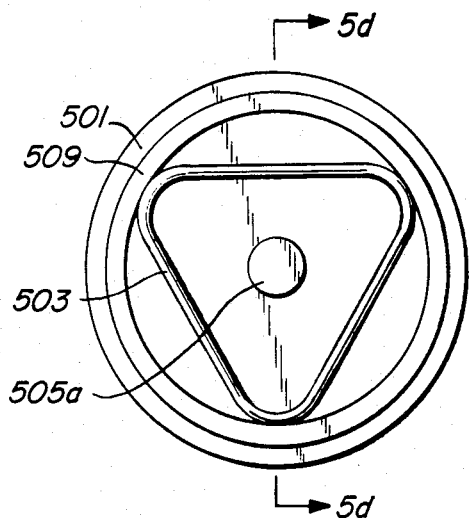
FIG._5a.
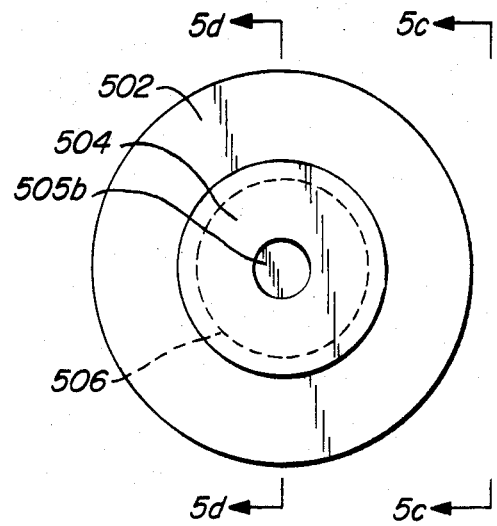
FIG._5b.
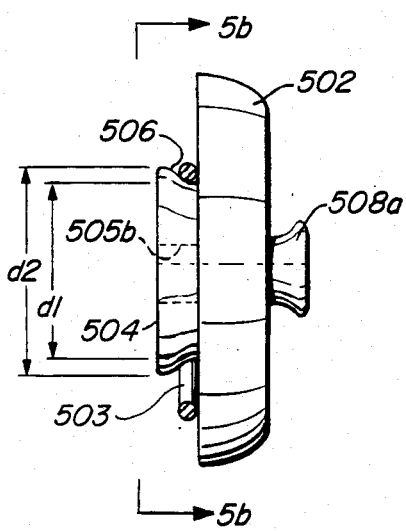
FIG._5c.
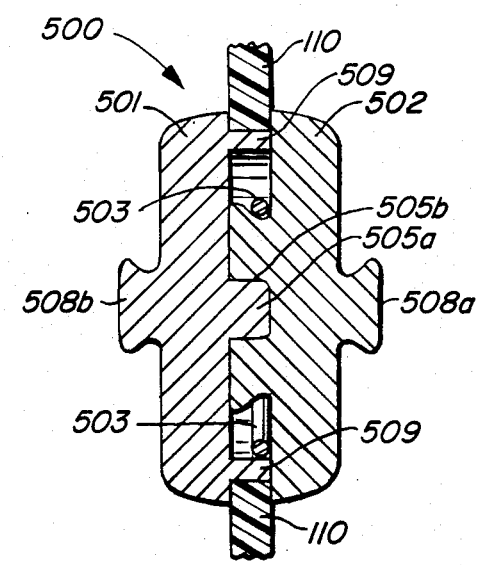
FIG._5d.

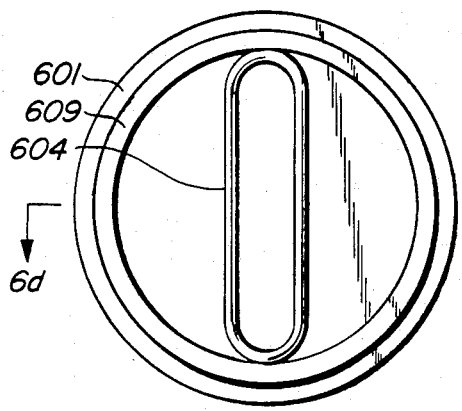
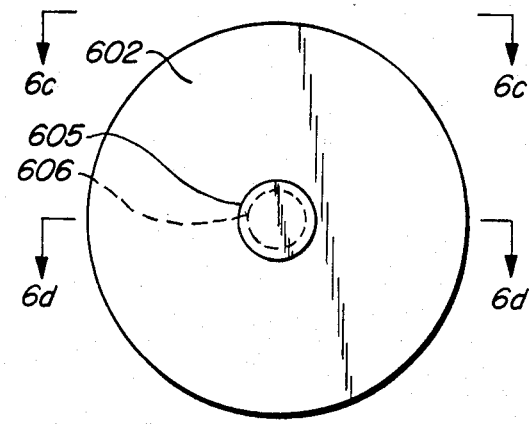
FIG._6a.  FIG._6b.
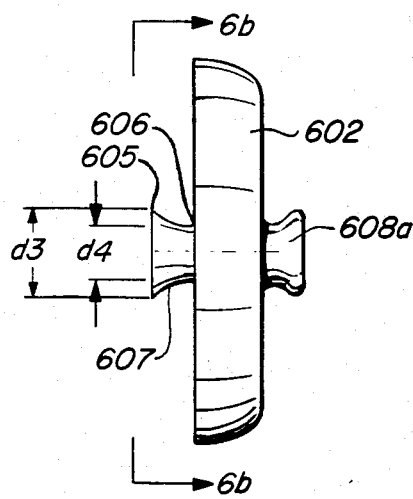
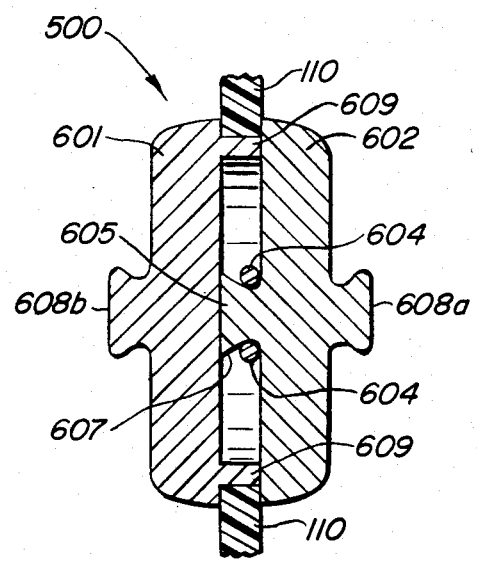
FIG._6c.  FIG._6d.

DISK AND PLUG

CROSS REFERENCE TO RELATED APPLICATIONS

This is a continuation-in-part application based on U.S. application Ser. No. 06/642,853 filed Aug. 21, 1984. It is also related to U.S. application Ser. No. 798,460, filed herewith, entitled ROBOTIC DISK HANDLER SYSTEM AND METHOD. Each of the related applications are incorporated herein by reference. Each of the applications include the same inventors and a common assignee.

BACKGROUND OF THE INVENTION

1. Field of the Invention

This invention relates to disks for use in disk drives and similar memory systems and in particular to an apertured disk and plug for use with the disk and a disk carrier in the manufacture of a disk which allows magnetic material to be coated simultaneously on the two surfaces of a disk without the passage of material from one side to the other side of the disk through the disk aperture during the coating process.

2. Prior Art

The manufacture of memory disks for use in disk drives and similar systems is well known in the art. In the manufacture of such circular disks, an aluminum or other suitable blank is coated on both sides with magnetic media, for example, a cobalt nickel-chromium alloy in which information will be stored. Typically the coating is done by sputtering. To implement the sputtering process it is well known to use vertical electrodes on each side of the disk and thus coat both surfaces of the disk simultaneously. During the coating process two things can happen. First, one electrode can be cross-contaminated by sputtered material from the other electrode passing by the disk. This causes particles to form on the target (i.e. the electrode) which later flake off and then land on the disk thereby changing the composition of the magnetic media and forming impurities on the surface of the disk. Second, the plasma from one electrode can interfere with the plasma from the other electrode thereby preventing uniform depositing of magnetic media on each disk surface. To prevent these two things from happening in the formation simultaneously of magnetic media on both sides of the disk, one electrode must be completely screened from the other electrode, including any central aperture of the disk which in actual use is mountable on the spindle of a disk drive.

In the coating of magnetic media on disk surfaces, a disk carrier is common used. The disk carrier must be designed so that it will not cause shadows on those portions of the disk surface on which magnetic media and other layers of material are being sputtered. Also, the carrier must be such that the disk can be easily loaded into the carrier by a human or a robot. In the prior art, the disk carriers have not been completely satisfactory in that the disk carrier typically has an opening between the top surface of the carrier and the disk which allows cross-contamination and plasma interference during the coating process and the disk central aperture is not properly sealed.

SUMMARY OF THE INVENTION

In accordance with this invention, the above problem of the prior art is overcome by use of a disk and plug which allows the disk to be easily loaded into a disk carrier by a human or robot but which at the same time prevents cross-contamination, shadowing, and interference by portions of the plasma of one electrode coating one side of the disk with magnetic media or other materials with the plasma generated by the other electrode coating the other side of the disk with magnetic media or other materials.

A disk holder or carrier is formed with at least one opening for receipt of a disk. The opening is specifically shaped so that the top circumference of a disk when placed in the opening is congruent with the top circumference of the opening in the disk carrier. A typical disk has a chamferred edge around its circumference. The bottom edge of the opening in the disk carrier is provided with a "V" or "U" groove or other channel or retainer so that the disk only rests on its chamferred edge. In accordance with this invention the "V" groove can be replaced with any other appropriately shaped channel or a pin structure such as three pins placed selected distances apart around the bottom porton of the opening to hold the chamferred edge of the disk. The material adjacent the top of the opening in the carrier is recessed a selected amount (typically one-half the thickness of the to-be-coated disk beyond the center plane of the carrier plus a selected tolerance (in one embodiment +0.005 to 0.010″) depending on the accuracy of the loading system) so that the disk can pass through the recessed portion during loading while no portion of the surface of the disk touches the carrier at any time. A portion of the carrier behind the recess extends down congruently to the edge of the disk when the disk is mounted in the opening. This recess in the carrier material adjacent the top of the disk both isolates one electrode from the other electrode and allows the disk to be loaded in the carrier without touching the to-be-coated disk surface to the carrier.

The disk carrier of this invention is a one piece carrier with no moving parts. The elimination of moving parts eliminates the need to align the disk to the carrier and thus eliminates particle generation and reduces set-up time.

In accordance with this invention, a special plug is provided for placement in the opening in the center of a disk. The plug allows for sealing the disk aperture from cross contamination and for thermal expansion of the disk during the sputtering process while holding the disk tight to prevent particle generation. During the sputtering operation, the plug cannot rattle on the disk or drop off when the disk expands.

This invention will be more fully understood in light of the following detailed description taken together with the drawings.

BRIEF DESCRIPTION OF THE DRAWINGS

FIG. 1 shows an isometric view of a disk carrier for use in sputtering magnetic media simultaneously on both sides of a memory disk;

FIGS. 2a and 2b show the front and back views of the disk carrier wherein the recessed eccentric opening superimposed on the openings in the front of the disk carrier in which the disk is mounted is apparent from comparison of the front and the back views of the carrier;

FIGS. 3a and 3b illustrate in cross-section a partial detailed side view and overall side view, respectively, of a carrier containing at least two disks so as to show the V groove bottom edge of each opening for retention of the chamferred edge of each disk in the bottom surface of the corresponding opening in the carrier and also illustrate the recess at the top portion of each opening in the carrier;

FIG. 3c illustrates in cross-section a side view of an alternate pin structure for retention of the chamferred edge of a disk in the bottom surface of the opening in the carrier.

FIG. 4 illustrates a plurality of openings formed in a larger carrier capable of holding a corresponding plurality of disks during manufacture including the sputtering of magnetic media on the two surfaces of each of the disks.

FIGS. 5a through 5d illustrate a one plug portion plan view, another plug portion plan view, another plug portion side view and a cross-sectional view of both plug portions mounted in a carrier opening, respectively, showing a center plug for placement in the center of each memory disk for subsequent sputtering operations in accordance with this invention.

FIGS. 6a through 6d illustrate a one plug portion plan view, another plug portion plan view, another plug portion side view and a cross-sectional view of both plug portions mounted in a carrier opening, respectively, showing a second embodiment of the center plug for use in the center of each memory disk during the sputtering operation in accordance with this invention.

DETAILED DESCRIPTION

Figure 7A:
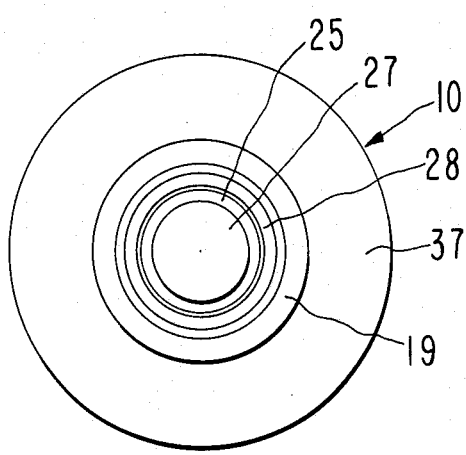
FIGS. 7a through 7d illustrate a plan view of a magnet portion, a plan view of a magnetic pole piece portion, a side view of said portions when assembled and a cross-sectional view of the assembled portions, respectively, showing a magnetic embodiment of the center plug.

While selected embodiments of this invention will be described below, other embodiments will be obvious in view of the following disclosure to those skilled in the art. Thus the following description is meant to be illustrative only and not limiting.

FIG. 1 illustrates an isometric schematic view of the carrier 100 with disc 110 mounted in opening 102 formed in carrier 100. Sputtering targets (i.e. electrodes) 131 and 132 are placed in a well-known manner on either side of disk 110 mounted in carrier 100. As shown in FIG. 1, a carrier 100 comprises a block of material 101 in which is formed an opening 102. Opening 102 is circular with its center at center line 106. Disk 110 mounts congruently within circle 102. Around and above the top portion of opening 102 a portion of carrier block 101 is removed to form a recess 104, the outer circumference 103 of which is circular and has a center given by the intersection of center line 107 with the plane of disk 102. Recess 104 extends only part way through material 101 sufficient to allow disk 110 to rest vertically in carrier 100 without either the to-be-coated front or back face of disk 110 actually touching the block 101 of carrier 100.

Recess 104 is formed so that disk 110 can be mounted in carrier 100 by hand or by a robot without either surface of the disk touching carrier 100. Any time the to-be-coated surface of disk 110 touches carrier block 101 small particles are generated or the surface is damaged. These particles may cause defects in the magnetic media being formed on both to-be-coated surfaces of disk 110 (FIG. 1). The disk carrier 100 substantially eliminates the generation of such particles or scratches, thereby substantially increasing the quality of disks capable of being fabricated. The depth of recess 104 must be just sufficient to allow the disk to be inserted in opening 102 without the surfaces to-be-coated touching the disk carrier.

FIGS. 2a and 2b illustrate the front and back views respectively of one embodiment of the disk carrier. As shown in FIG. 2a, the opening 102 in the carrier material 101 is formed with a radius R1 about center 106. An internal groove 108 (shown in dash lines in FIGS. 2a and 2b) is formed in the bottom 150° (75° to either side of the vertical radius to the bottom of portion 109b opening 102) of the edge of opening 102. The length of the groove is not critical and indeed the groove must merely be of such a length as to hold the disk. A portion of the remainder of the circumference of opening 102 is occupied by recess 104. In the embodiment shown the recess 104 is formed for 105° on either side of the vertical radius R1 from center 106 to the top of circumference of opening 102. The center plane of the carrier is defined as the plane parallel to the two surfaces of the disk which is occupied by the center of the disk when the disk is mounted vertically in the carrier. Recess 104 is formed with an outer circumference 103 generated by radius R2 rotating about center point 107. Center 107 is offset from center 106 in one embodiment suitable for use in fabricating 5¼" disks, by, for example, 0.1969 inches. The use of two off-center circles to form recess 104 simplifies the manufacture of the carrier of this invention. The recess 104 is formed by removing material within and over portion 109a of circumference 103 of carrier block 101 from the front face of the carrier to a selected depth. Typically, this depth is such that the distance from the center plane of a disk placed in the carrier to the back wall of recess 104 is equal to half the thickness of the to-be-coated disk, plus a 0.005" tolerance, so that the back surface of the disk does not touch the disk carrier upon insertion of the disk into or removal of the disk from the carrier. This depth is selected to ensure that the back wall of the recess 104 is aligned with the back surface of the to-be-coated disk within a selected tolerance.

The bottom portion 109b of opening 102 has formed therein in one embodiment a "V groove 108" with (as shown in FIG. 3a) an angle of 60° and a depth of 0.060 inches (1.53 millimeters). The bottom vertex of the V groove is formed 0.060 inches from the external front surface 301f of carrier 100.

FIG. 3a illustrates in more detail the cross-section of one embodiment of the edge. In FIG. 3a, V groove 300 is formed in edge 102 to a depth of 0.060 inches. The center of the V groove 301 is 0.060 inches from front face 301f of carrier 100. The V groove has two surfaces 302a and 302b which form an angle of 60°, each surface forming an angle of 30° with the vertical. The front face 301f is chamferred at 10° from the vertical for a distance of 0.060 inches before the top of edge 102 is reached and the back face 301b is chamferred 10° from the vertical for a distance of about one-quarter inch before the top of edge 102 is reached. Of course, other means for holding the bottom of the disk in place in the carrier can be used. Thus, as shown in FIG. 3c, two or more pins can be attached to the front surface of the carrier to hold the bottom edge of the disk in proper position in the carrier.

The relationship of carrier 100 to a disk is shown in more detail in a side view in FIG. 3b. FIG. 3b illustrates in cross-section two openings formed in a carrier 301 capable of holding at least two disks 110-1 and 110-2. Disks 110-1 and 110-2 are shown mounted in the carrier with the chamferred edges 310-1 and 310-2 of each disk 110-1 and 110-2 respectively resting in the bottom V groove of the corresponding openings 102-1 and 102-2. The recesses 104-1 and 104-2 are clearly depicted in the cross-sectional view. Such recesses allow the disks 110-1 and 110-2 to be entered into the openings 102-1, 102-2 with the center of each disk 110-1 and 110-2 above its corresponding at-rest center line 106-1 and 106-2, respectively, and then lowered onto the bottom edge V grooves 300-1 and 300-2 of openings 102-1 and 102-2. The back side 104-1b of recess 104-1 and the back side 104-2b of recess 104-2 is selected to be half the thickness of the disk plus a selected tolerance from the center plane of the corresponding disk 110-1 and 110-2, respectively. The center plane of the disk is that plane occupied by all points on the disk equidistant from the two plane surfaces of the disk. The depths of the recesses 104-1 and 104-2 are measured from this center plane when the disks are mounted vertically in the carrier as shown in FIG. 3b.

An alternative to the "V" groove of FIG. 3a is a pin structure shown in FIG. 3c. Disk 110-1 is shown mounted with the chamferred edge 320-1 resting in the step-like recess 311 of a clamp 312. Clamp 312 is attached by screws 313, or some other fastening means to the carrier 314. The protruding rectangular portion 315 is flush against one side of disk 110-1, and the uppermost portion of carrier 314 is flush against the other side so as to hold disk 110 in place.

FIG. 4 illustrates a carrier with a plurality of six openings 102-1 through 102-6 formed in the carrier for receipt of a corresponding number of disks. Thus the carrier of FIG. 4 can be used in the sputtering simultaneously of magnetic media on both sides of six magnetic disks. Each opening 102-1 through 102-6 in carrier 100 is as described above in conjunction with FIGS. 1, 2a, 2b, 3a, and 3b.

In accordance with this invention the top edge of each opening 102 contains a portion 104 recessed an amount into the carrier 100 selected so that the to-be-coated surface of the disk 110 (FIG. 1), for example, does not touch the carrier block 101. Such a carrier is particularly suitable for loading using robots because robots can stop within 100 microinches of a surface. This prevents particular generation which would interfere with the quality of the resulting coated disk.

The surface of the disk carrier adjacent the disk is beveled 10° or less from the plane of the surface to prevent shadowing by the edge of the opening in the carrier of the material being coated on the surfaces of the disk.

The recess 104 at the top of each opening 102 in the carrier serves two purposes. It provides isolation so that magnetic media can be coated simultaneously on both sides of the disks without cross-contamination and without interference. Secondly, it allows the disk to be loaded into the carrier without touching the disk surface to the carrier.

In the prior art, the opening in which the disk was mounted for coating was formed with a larger diameter than the disk. Unfortunately the annular open space between the edge of the disk and the opening in the carrier allowed plasma interference and cross-contamination. While it has been proposed to use a movable gate which can come down on top of the disk to close this annular open space after the disk has been loaded in the carrier, movement of one material relative to another generates particles which contaminate the magnetic media formed on the surface of the disk. This type of carrier is also harder and thus more expensive to make. Accordingly, the disk carrier of this invention comprises a one piece unitary carrier without moving parts which is easily loadable with the to-be-coated disk and which automatically self-aligns the disk in the carrier to prevent cross-contamination and plasma interference. The disk carrier of this invention is also cheaper to make than prior art disk carriers with movable parts. The use of a unitary carrier saves the need for any alignment of the disk to the carrier and thus reduces the cost of both the carrier and its use in coating a disk and avoids moving parts.

FIGS. 5a through 5d illustrate one embodiment of a center plug 500 of this invention for placement in the center of the disk to prevent plasma from flowing through the opening in the center of the disk from one side to the other of the disk. The plug not only blocks the opening in the disk but serves as a knob or handle by which the disk can be handled, carried, mounted in and removed from the carrier 100 (FIG. 1). As shown in FIG. 5a, portion 501 of the center plug 500 has formed in the interior of the plug a triangularly shaped spring means comprising spring wire section 503. Wire 503 is arranged in a triangular shape in the interior of circular, annular ridge 509 which serves both to hold wire 503 at its apices and to provide an outer stop for the inner diameter of disk 110. Cylindrical knob 505a protrudes outward from the center of the interior of portion 501 of plug 500 so that its cross-sectional planar end is coplanar with the top of annular ridge 509. Wire 503 is configured such that center protrusion 504 on portion 502 of plug 500 as shown in FIG. 5b fits within the triangle formed by wire 503 in such a manner that portions of the wire 503 between the apices presses tangentially and hard against circumferential surface 506 of protrusion 504. Cylindrical hole 505b, extending through the center of protrusion 504, allows for the receipt of cylindrical knob 505a. As shown in FIG. 5c, the center protrusion 504 has a tapered circumferential surface 506 such that the diameter d1 of the protrusion 504 where the protrusion 504 joins base 502 is less than the diameter d2 of protrusion 504 at its end furthest from base 502. Accordingly wire 503 will tend to pull plug portion 502 toward plug portion 501. However, as the disk 110 (FIG. 5d) expands in thickness due to a change in its temperature during the sputtering process, the plug 500 also must expand to accommodate the disk 110. Thus portions 501 and 502 will be pushed apart but wire 503 will merely ride along surface 506 of plug 504 from the smaller toward the larger diameter. The plug 500 remains tightly located within the center hole of disk 110 thereby preventing particle generation while traveling to accommodate the thermal expansion of disk 110. Any particles generated by the movement of wire 503 against surface 506 are kept within the hole within disk 110 by the tight clamping of plug 500 against the two surfaces of disk 110 adjacent the hole in the disk. Thus the plug does not rattle on the disk or pop off the disk when the disk expands.

Knob-like protrusions 508a and 508b extending outward from the exterior sides of portions 502 and 501, respectively, as shown in FIG. 5d, allow the disk clamped in the plug to be handled by a person or a robot for placement in the carrier 100 or removal from the carrier.

FIGS. 6a through 6d illustrate a second embodiment of the center plug 500 for placement in the center of each memory disk during the sputtering operation in accordance with this invention. As shown in FIG. 6a, portion 601 of the center plug 500 has formed in the interior of the plug a circular annular ridge 609. Ridge 609 serves both to hold spring wire means 604 and to provide an outer stop for the inner diameter of disk 110. Spring wire means 604 is placed within annular ridge 609 forming an elongated oval along a cross-sectional diameter of the portion 601. Wire 604 is further configured such that center protrusion 605 on portion 602 of plug 500 as shown in FIG. 6b fits within the oval formed by wire 604 in such a manner that wire 604 presses tangentially and hard against circumferential surface 607 of protrusion 605. As shown in FIG. 6c, the center protrusion 605 has a tapered circumferential surface 607 such that the diameter d4 of the protrusion 605 where the protrusion 605 joins base 606 is less than the diameter d3 of protrusion 605 at its end furthest from base 606. Accordingly, wire 604 will tend to pull plug portion 602 toward plug portion 601. Knob-like protrusions 608a and 608b (FIG. 6d) extending outward from the exterior sides of portions 602 and 601, respectively, allow the disk clamped in the plug to be handled by a person or robot for placement in or removal from carrier 100.

Figure 7B:
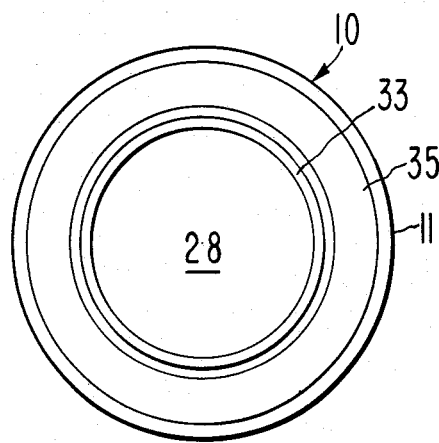
Figure 7C:
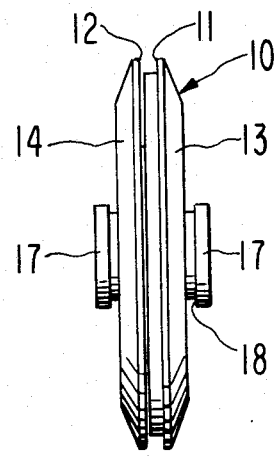
Figure 7D:
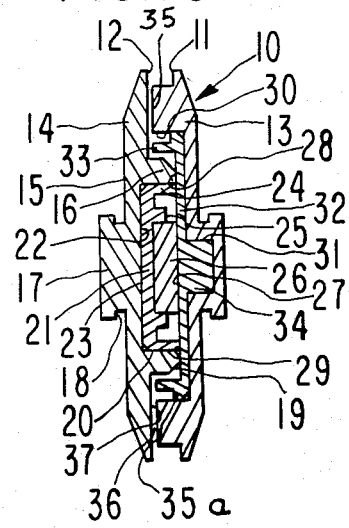

FIGS. 7a through 7d show a magnetic embodiment of the plug invention. As in the other embodiments, plug 10 is insertible into the center aperture of the disk so that edge portions 11 and 12 of plug portions 13 and 14 in FIG. 7d abut the peripheral edges of a center aperture of disk 110 (FIG. 6d). Plug portion 14 comprises a stainless steel circular base wall 15 having an integral circular ridge 16 extending therefrom toward the plug portion 13 and a knob extension 17 having a re-entrant head portion 18 for accepting grasp fingers of a robotic arm, i.e. end effector, or a manual plug-grasping jig (not shown) where it is desired to manually move a disk with attached plug. Ridge 16 has a beveled outer peripheral surface for directing, self-aligning and assembling the two plug portions together. The inner surface 20 of ridge 16 extends perpendicularly to base wall 15 and is sized to receive by a press fit a circular cylindrical cup magnet pole piece 21 having a flat inner wall 22 adapted to seat in recess 23 bounded by ridge 16. Pole piece 21 of soft iron comprises an outer circular wall 24 perpendicular to wall 22 which seats in the wall of circular recess 23. An inner wall 25 perpendicular to wall 22 is provided into which a circular permanent magnet disk 26 is press fit. The outer magnet surface 27 extends outward from wall 25 and is parallel to the plane of the outer surface 28 of pole piece 21 and the outer tip 29 of wall 20. Magnet 26 is preferably made of Alnico material. Preferably, magnet surface 27 is spaced from the surface 28 when assembled so as to avoid generation of magnetic contamination particles. Such spacing is about 0.004 inches which will not appreciably affect the magnetic flux field holding the two sections of the plug together.

The other plug portion 13, also typically of stainless steel material, has a circular recess 30 and a central bore 31 extending partially into portion 13. A second magnetic pole piece 32 of magnetic material such as soft iron in the form of a cup has an integral circular side wall or ridge 33 extending toward plug portion 14, a closed bottom wall 35a press fit into recess 30, and an integral center plug 34 extending oppositely from ridge 33. Center plug 34 is press fitted into bore 31. When assembled, annular surface 35 of portion 13 may contact surface 37 of portion 14 or a slight gap 36 provided to avoid contaminating particle generation. A magnetic circuit is provided by the respective pole pieces 21 and 32 with magnet 26 so that the magnetic flux field is kept substantially within the inner periphery of the plug portions. For example, with a 600–650 gauss magnetic field centrally of the plug adjacent the magnet surface 27, testing showed an exterior magnetic flux of about 30 gauss at the exterior area by knobs 17 and 1.5 gauss at the peripheral edges 11 and 12. The latter reading is sufficiently low so as to not affect the magnetic read/write material sputtered on both sides the disk to which the plug is attached during that operation. The interaction of the pole pieces 21 and 32 results in a relatively large diameter magnetic field of sufficient strength which effectively supports the plug and the disk and allows that combination to be inserted and removed into the disk carrier for the sputtering operation and for the plug to be inserted and held within the disk central aperture under the plasma conditions present in the sputtering machine. Press fitting of the pole pieces and magnet with no use of adhesives or solder, prevents outgassing or other contaminants incidental to the high temperatures about 200°–300° C. in an RF sputtering machine from impacting the surfaces to be coated with magnetic media.

In practice a number of disks are placed simultaneously in a carrier containing a plurality of openings as shown in FIG. 4 thereby allowing the magnetic media to be sputtered simultaneously on all surfaces of the disks in the carrier. Recesses may be formed in the carrier adjacent to openings on one side of the carrier and on the other side of the carrier adjacent to the other openings so that loading and unloading of disks can be done simultaneously on both sides of the carrier by one or more robotic arms on opposite sides of the carrier.

While several embodiments of the above invention have been described, other embodiments of this invention will be obvious in view of this disclosure. In particular, other embodiments of the plug using other configurations for the spring and magnet will be obvious in view of this disclosure.

We claim:

1. In combination, a circular flat computer disk having a central aperture and an aperture-closing plug, said plug comprising:
    first and second imperforate plug portions;
    each of said plug portions having a circular peripheral edge portion abutting said sealing-off entry to said disk central aperture at opposite sides of said disk;
    means within at least one of said plug portions and extending within said disk central aperture for engaging the other of said plug portions for holding said plug portions together on opposite sides of said disk; and
    means on a surface of each of said plug portions outward of said disk central aperture for grasping said plug portions to insert and pull said plug portions from said disk central aperture.

2. The invention set forth in claim 1 in which said means for engaging said plug portions comprises a spring mounted in one of said plug portions and a tapered protrusion extending from the other of said plug portions, such that upon insertion of said plug portions into said disk central aperture, said spring engages said tapered protrusion and holds the plug portions together in said disk central aperture.

3. The invention set forth in claim 2 in which said spring is a triangularly shaped wire spring and wherein said one of said plug portions includes an annular ridge holding apices of said triangularly shaped wire spring and wherein said tapered protrusion of said other plug portion is cylindrical and includes an annular outer surface tapered inwardly toward a central axis of the protrusion from adjacent an outer edge of said protrusion such that said annular outer surface engages portions of said triangular-shaped wire spring between said apices.

4. The invention as set forth in claim 2 in which said means for engaging said plug portions further comprises a central protrusion on said one of said plug portions and a central aperture in said tapered protrusion sized to receive said central protrusion upon insertion of said plug portions in said disk central aperture.

5. The invention as set forth in claim 1 in which said means for grasping said plug portions comprises a knob extending from an exterior surface of each of said plug portions to facilitate insertion, handling and removal of said plug portions in and from said disk central aperture.

6. The invention as set forth in claim 1 in which said means for engaging comprises a permanent magnet in said one of said plug portions and a first magnetic pole piece in said other of said plug portions such that, upon insertion of said plug portions into said disk central aperture, said magnet and said first pole piece magnetically hold said plug portions together in said disk central aperture.

7. The invention as set forth in claim 6 wherein said one of said plug portions includes a second pole piece annularly encircling said permanent magnet and wherein, when said plug portions are magnetically held together, said first pole piece annularly encircles said second pole piece.

8. The invention as set forth in claim 7 in which said plug portions are nonmagnetic material and said first pole piece is of magnetic material.

9. The invention as set forth in claim 8 in which said first pole piece comprises:
   an open top cylindrical cup having a closed bottom, a cylindrical side wall and a cup plug extending from said closed bottom in a direction opposite said cylindrical side wall;
   a plug central bore in said one of said plug portions for receiving and holding said cup plug such that the open top of said cylindrical cup is coplanar with a surface of said one of said plug portions abutting peripheral edges of said disk central aperture; and
   wherein said second pole piece comprises an open top cylindrical cup having a closed bottom, an outer cylindrical side wall extending through said disk central aperture to a position such that a top of said cylindrical side wall abuts the closed bottom of said first pole piece cylindrical cup, and an interior cylindrical wall, said magnet being confined in and extending from said interior cylindrical wall coplanar with said top of said cylindrical wall of said second pole piece, whereby a magnetic closed circuit is provided between said magnet and said first and second pole pieces and the amount of magnetic flux minimized at the periphery of each of said plug portions.

10. The invention set forth in claim 9 in which said other of said plug portions includes a cylindrical inner wall having a beveled outer surface for insertion into said open top cylindrical cup of said first pole piece and an inner surface for receiving said outer cylindrical side wall of said second pole piece.

11. A closure plug for insertion into a central aperture of a magnetic disk, said plug comprising:
   a first imperforate plug portion having an outer periphery sufficient to seal off one side of a disk central aperture when inserted therein;
   a second imperforate plug portion having an outer periphery sufficient to seal off a second side of said disk central aperture when abutting an edge of said disk central aperture;
   means within at least one of said first and second plug portions for engaging the other of said first and second plug portions for holding said first and second plug portions on opposite sides of a magnetic disk; and
   means on an exterior surface of each of said first and second plug portions for engaging and pulling said first and second plug portions apart.

12. The invention set forth in claim 11 in which said means for engaging comprises a spring means in said first plug portion and a protrusion in said second plug portion, said spring means and said protrusion being engagable to hold said first and second portions together.

13. The invention set forth in claim 11 in which said means for engaging comprises magnetic means in said first and second plug portions.

14. The invention set forth in claim 13 in which said magnetic means comprises a permanent magnet within said first plug portion and a first magnet pole piece in said second plug portion.

15. The invention set forth in claim 14 in which said first magnet pole piece surrounds said permanent magnet in assembled position to form a magnetic circuit within said first and second plug portions.

16. The invention set forth in claim 15 further comprising a second magnet pole piece in said first plug portion surrounding said permanent magnet and being in contact with an inboard portion of said first magnet pole piece.

* * * * *

UNITED STATES PATENT AND TRADEMARK OFFICE
CERTIFICATE OF CORRECTION

PATENT NO. : 4,634,512
DATED : 01/06/87
INVENTOR(S) : Ronald Allen et al.

It is certified that error appears in the above-identified patent and that said Letters Patent is hereby corrected as shown below:

Col. 3, line 46, before "carrier" delete "a".

Col. 5, line 45, delete "particular" and insert --particle--.

Col. 8, line 33, delete "to the other" and insert -- to other--.

Signed and Sealed this

Thirty-first Day of March, 1987

Attest:

DONALD J. QUIGG

Attesting Officer

Commissioner of Patents and Trademarks